United States Patent
Sako et al.

(10) Patent No.: US 6,980,083 B2
(45) Date of Patent: Dec. 27, 2005

(54) RADIO COMMUNICATION SYSTEM, RADIO COMMUNICATION APPARATUS, AND RADIO COMMUNICATING METHOD

(75) Inventors: Ikuo Sako, Kokubunji (JP); Yoshiteru Tanaka, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 371 days.

(21) Appl. No.: 10/070,357

(22) PCT Filed: Jul. 5, 2001

(86) PCT No.: PCT/JP01/05854

§ 371 (c)(1),
(2), (4) Date: Sep. 11, 2002

(87) PCT Pub. No.: WO02/05437

PCT Pub. Date: Jan. 17, 2002

(65) Prior Publication Data

US 2003/0038731 A1    Feb. 27, 2003

(51) Int. Cl.[7] ............................ G08B 5/22; H04Q 7/00; H04Q 7/20

(52) U.S. Cl. .................. 340/7.52; 340/7.32; 340/7.38; 340/7.51; 455/462; 455/466

(58) Field of Search .............................. 340/7.52, 7.38, 340/7.32, 7.51; 455/466, 462, 343.8

(56) References Cited

U.S. PATENT DOCUMENTS

| | | | | |
|---|---|---|---|---|
| 5,347,269 A | * | 9/1994 | Vanden Heuvel et al. | 340/7.56 |
| 5,705,995 A | * | 1/1998 | Laflin et al. | 340/7.48 |
| 5,842,216 A | | 11/1998 | Anderson et al. | |
| 5,917,424 A | * | 6/1999 | Goldman et al. | 340/7.22 |
| 6,041,351 A | | 3/2000 | Kho | |
| 6,067,444 A | * | 5/2000 | Cannon et al. | 340/7.44 |
| 6,154,147 A | * | 11/2000 | Gabrielle et al. | 340/7.52 |
| 6,204,774 B1 | * | 3/2001 | Miwa et al. | 340/5.2 |
| 6,381,241 B1 | * | 4/2002 | Ghirnikar et al. | 370/394 |
| 6,622,124 B1 | * | 9/2003 | Kolls | 705/14 |

FOREIGN PATENT DOCUMENTS

| | | |
|---|---|---|
| JP | 09-307590 | 11/1997 |
| JP | 10-032504 | 2/1998 |

OTHER PUBLICATIONS

Haartsen et al., "The Bluetooth Radio System," IEEE Personal Communications (Feb. 2000), pp. 28-36.
Copy of International Search Report dated Sep. 13, 2002.

* cited by examiner

Primary Examiner—Michael Horabik
Assistant Examiner—Scott Au
(74) Attorney, Agent, or Firm—Finnegan, Henderson, Farabow, Garrett & Dunner, L.L.P.

(57) ABSTRACT

A mobile station capable of connected to an information providing server via a radio link, comprises a reception history table which stores an identification of information which has been received, and a controller which prevents the same information from being received based on the identification in the reception history table.

8 Claims, 10 Drawing Sheets

| USER FRIENDLY NAME | BT ADDR | APL ID | APL SUB ID | APL SUB ID | DATE INFORMATION | CONTENTS POINTER |
|---|---|---|---|---|---|---|
| xxxxxxx | xxxxxx | 1 | 1 | 1 | xxxxxx | C1 |
| xxxxxxx | xxxxxx | 1 | 2 | 2 | xxxxxx | C2 |
| ----- | ----- | ----- | ----- | ----- | ----- | ----- |

| USER FRIENDLY NAME | BT ADDR | DATE INFORMATION | CONTENTS POINTER |
|---|---|---|---|
| ××××× | ××××× | ××××× | ××××× |
| ⋮ | ⋮ | ⋮ | ⋮ |

FIG. 13

FIG. 14 | BT ADDR | INFORMATION INDICATING ALREADY RECEIVED |

FIG. 15 | BT ADDR | DATE INFORMATION |

RADIO COMMUNICATION SYSTEM, RADIO COMMUNICATION APPARATUS, AND RADIO COMMUNICATING METHOD

TECHNICAL FIELD

The present invention relates to a short distance radio communication system, particularly to a radio communication system and radio communicating method realizing power saving of a radio communication apparatus.

BACKGROUND ART

In recent years, a short distance radio interface called Bluetooth has been developed in which a 2.45 GHz Industrial Scientific Medical (ISM) band is used as a carrier wave frequency, and various mobile apparatuses such as cellular phones, notebook-size personal computers, digital still cameras, and mobile game machines can be connected by radio.

In a radio communication system including such an interface, the same information is repeatedly transmitted in the same frequency band in some cases. When the cellular phone is used as a mobile radio apparatus, the cellular phone is constantly waiting for reception. Even when information has the same content as that of the already received information, the information is repeatedly received. Therefore, there is a problem that power consumption during reception increases and a battery is remarkably consumed. For example, while a user waits for someone in front of a station ticket gate, a train timetable, a fare table, and the like are repeatedly transmitted, such information is repeatedly received by a mobile terminal, and power is consumed during waiting. To prevent this problem, the user has to temporarily turn off a power supply of radio communication. However, with the cellular phone, when the power supply is turned off, an inherent function of the cellular phone is hindered. Therefore, this is not a realistic solution.

Moreover, since the same information is repeatedly transmitted, the radio terminal has no memory for storing the received information. Therefore, the already received portion of information cannot be confirmed. When a video/music program is transmitted in real time, and if the user starts browsing the information from a midway timing of the program, a first part of the program cannot be seen until the next transmission of the program.

On the other hand, a technique associated with power saving of the radio apparatus is disclosed in Japanese Patent Disclosure (KOKAI) No. 10-32504. This discloses a technique of judging an influence of noise or the like in an early stage, preventing a received current from increasing, and realizing the power saving. That is, if a time for which reception strength indicates a determined value or a smaller value continues for not less than a predetermined time, it can be determined that a received signal includes a noise and therefore a normal signal cannot be received. Thus, the reception is stopped. In this method, however, the same repeatedly transmitted information cannot be prevented from being received many times.

As described above, in the radio communication system using the conventional short distance radio interface, when the radio communication is performed in the same frequency band, a receiving apparatus constantly receives transmitted information. Therefore, even if the same information is received, the power consumption during reception increases, and the battery is remarkably consumed.

Moreover, when video or sound information is received in real time, the memory for storing the information being received is not provided. The information is browsed from halfway depending upon a browsing start timing. Therefore, it cannot be guaranteed that the information is transmitted to the user from the beginning.

DISCLOSURE OF INVENTION

The present invention is directed to method and apparatus that substantially obviates one or more of the problems due to limitations and disadvantages of the related art.

According to one aspect of the present invention, a radio communication apparatus comprises a reception history table configured to store information-identification identifying information which has been received; and a controller configured to prevent information from being received of which information-identification is stored in the reception history table.

According to another aspect of the present invention, a radio communication apparatus comprises a transmission history table configured to store information-identification identifying information which has been transmitted; and a controller configured to prevent information from being transmitted of which information-identification is stored in the transmission history table.

BRIEF DESCRIPTION OF DRAWINGS

The accompanying drawings, which are incorporated in and constitute a part of the specification, illustrate presently embodiments of the present invention and, together with the general description given above and the detailed description of the embodiments given below, serve to explain the principles of the present invention in which.

BEST MODE FOR CARRYING OUT OF THE INVENTION

Embodiments of the present invention will be described hereinafter with reference to the drawings.

Figure 1:
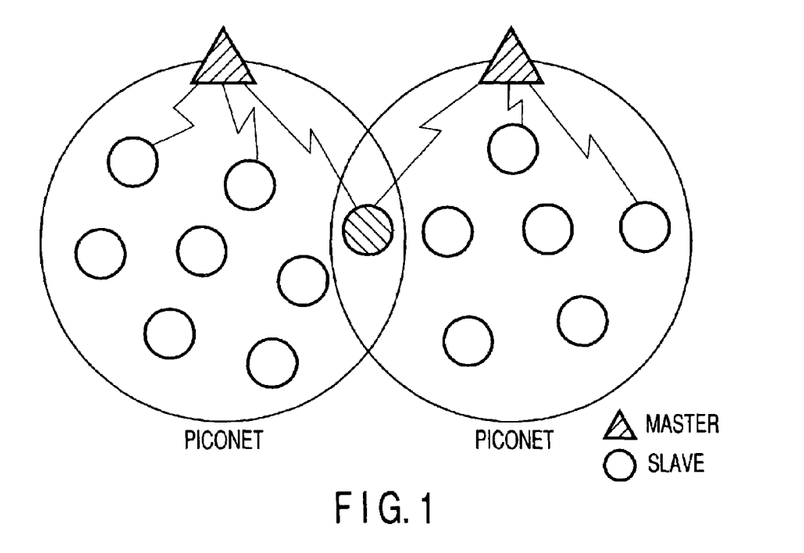
FIG. 1 is a diagram showing a Bluetooth communication network model.

In the embodiments, an example of a communication system by a Bluetooth interface will be described. FIG. 1 is a network configuration diagram showing a Bluetooth communication model. In communication of one apparatus with the Bluetooth interface mounted thereon with a multiplicity of apparatuses, the communication apparatuses are classified into master and slave. One master and seven slaves at maximum constitute a network called Piconet. The master can communicate simultaneously with seven slaves at maximum. A network formed by connecting plural Piconets is called Scatternet.

Figure 2:
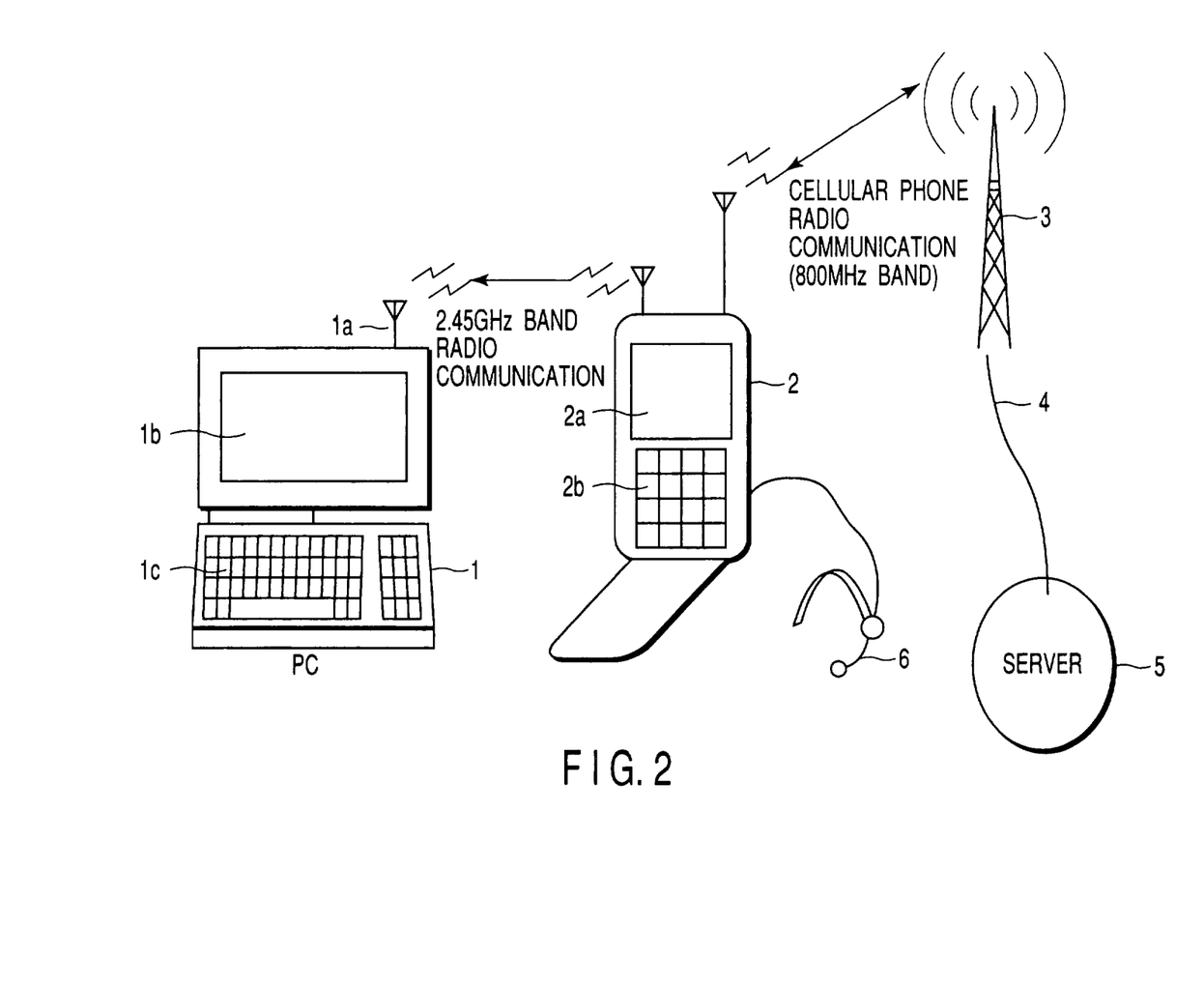
FIG. 2 is a diagram showing the whole radio communication system according to one embodiment of the present invention.

FIG. 2 shows the whole configuration of the radio communication system according to the present embodiment.

A mobile station 2 corresponding to the slave in FIG. 1 (here a cellular phone is described as an example, but the mobile station is not limited to the cellular phone, and may be a mobile personal computer or the like, or constituted of different types of mobile apparatuses) uses radio waves, for example, of the 800 MHz band to transmit/receive sound or data with respect to a base station (cellular phone base station) 3 installed in each district. The base station 3 constitutes a predetermined radio zone called a service area, and realizes communication with the cellular phone 2 in the radio zone. The base station 3 is connected to a server 5 via a public switched telephone network 4. The cellular phone 2 can also be used with a head set 6 for talking.

The cellular phone 2 is equipped with not only a radio communication interface for transmitting/receiving radio waves of the 800 MHz band to/from the base station 3, but also a radio communication interface for transmitting/receiving radio waves of the 2.45 GHz band to/from a personal computer 1. The cellular phone 2 includes an LCD 2a for displaying data, a keyboard 2b for inputting the data, and the like.

An information providing server corresponding to the master in FIG. 1 (here the personal computer 1 is described as an example, but the server is not limited to the personal computer, and may be a mobile personal computer or the like, or the same type of apparatus as the slave) is connected to the cellular phone 2 via radio waves of a specific frequency band which differs from radio waves for use in a cellular phone system. Concretely, the Bluetooth system of the 2.45 GHz band is used. The Bluetooth system is of a short-distance radio communication standard, and uses radio waves of the 2.45 GHz band to realize a radio communication range of about 10 m.

The personal computer 1 comprises an antenna 1a for transmitting/receiving radio waves of the 2.45 GHz band with to/from the cellular phone 2, an LCD 1b for use as a display monitor, and a keyboard 1c for inputting data.

Figure 3:
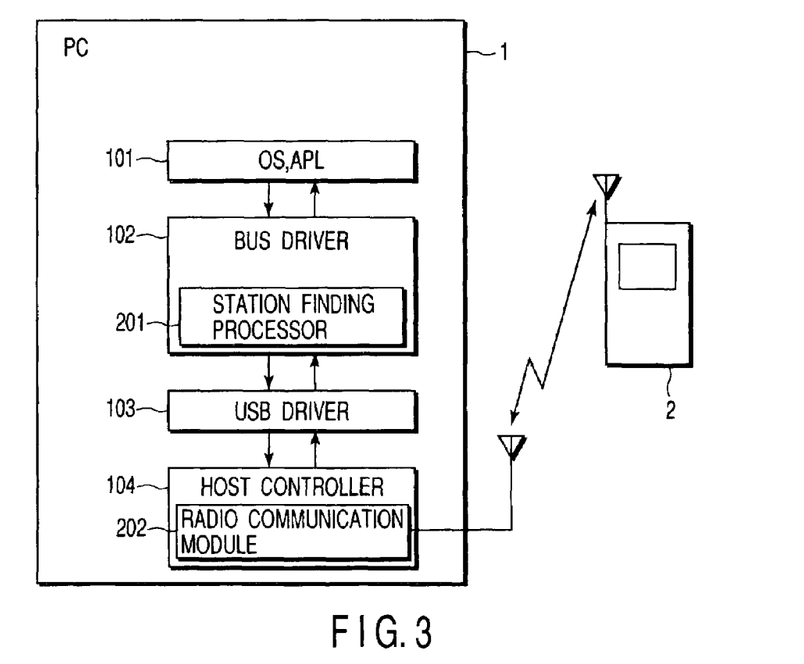
FIG. 3 is a schematic diagram showing a basic configuration of an information providing server for use in the radio communication system according to the embodiment of the present invention.

FIG. 3 is a schematic diagram showing a basic configuration of the personal computer 1. The personal computer 1 establishes a local link and communicates with the cellular phone 2 via radio waves. When the radio link is established, the cellular phone 2 can receive the information periodically transmitted from the personal computer 1 via radio waves.

A host program 101 such as an operating system (OS) and application program (APL) and a Bluetooth driver (BUS driver) 102 are resident in a memory on the personal computer 1 (Host side). The BUS driver 102 controls a host controller 104 as a Bluetooth device itself via a USB driver 103. As shown in FIG. 3, the BUS driver 102 of the present embodiment includes a station finding processor 201.

The station finding processor 201 is a software module for inquiring the presence of the cellular phone 2 with a Bluetooth radio module mounted thereon in an area within reach of radio waves of the personal computer 1.

The host controller 104 includes a radio communication module 202 formed of a link manager controller, and the like. The radio communication module 202 carries out physical linking control with respect to the cellular phone 2.

For the configuration of the personal computer 1 and cellular phone 2, a hardware configuration and software configuration will be separately and concretely described.

Figure 4:
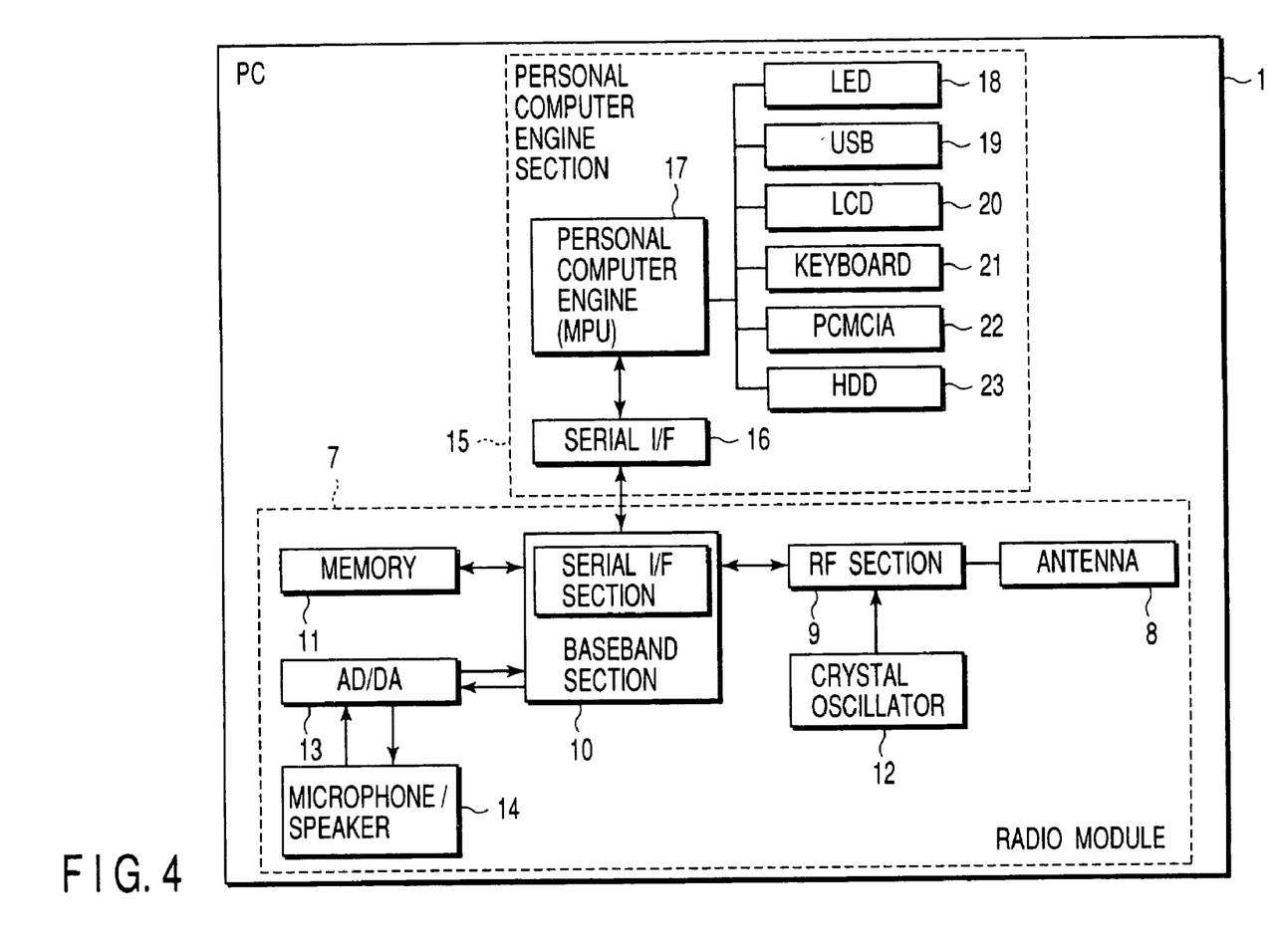
FIG. 4 is a block diagram showing a hardware configuration of an information providing server shown in FIG. 2.

Constitution of Personal Computer 1:

FIG. 4 is a block diagram showing the hardware configuration of the personal computer 1. A hardware portion for realizing the present system will mainly be described.

In the personal computer 1, as a radio module 7 for using radio waves of the 2.45 GHz band to communicate with the cellular phone 2, a radio antenna 8, radio frequency (RF) section 9, radio baseband section 10, memory 11, crystal oscillator 12, AD/DA converter 13, and microphone/speaker 14 are mounted. A similar radio module is also mounted on the cellular phone 2. The radio module 7 is connected to a personal engine section 15 as a personal computer main unit via a serial interface 16 such as a USB as described above.

The radio antenna 8 is a section for transmitting/receiving radio waves of the 2.45 GHz band to realize the radio communication with the cellular phone 2. During reception, the RF section 9 performs a processing of mixing radio waves received via the radio antenna 8 with a local frequency signal oscillated from the crystal oscillator 12, converting the received signal from the radio antenna 8 to an intermediate frequency (IF) signal, and subsequently demodulating the IF signal to a digital signal to be handled by the radio baseband section 10. The radio baseband section 10 performs a protocol processing. The radio baseband section 10 converts the signal inputted via the radio antenna 8 and RF section 9 to a data string which can be processed by a CPU.

During transmission, the reception flow is reversed. That is, the radio baseband section 10 converts transmission data to a signal to be handled by the RF section 9 according to a predetermined protocol, and the RF section 9 modulates the signals to radio waves of the 2.45 GHz band and transmits radio waves via the radio antenna 8.

The microphone/speaker 14 is a device for inputting/outputting a sound signal, and is connected to the radio baseband section 10 via the AD/DA converter 13.

The personal computer engine section 15 comprises: a personal computer engine (MPU) 17 including a CPU, memory, peripheral control circuit, and the like; a light emitting diode (LED) 18 for displaying a warning or the like; a USB interface 19 for connecting a peripheral device of the universal serial bus (USB) standard; a liquid crystal display (LCD) 20 for use as a display monitor; a keyboard 21 for inputting data; a personal computer memory card international association (PCMCIA) interface 22 for mounting a PC card; a hard disk drive (HDD) 23 in which a history management table and contents to be transmitted are stored as described later; and the like.

Figure 5:
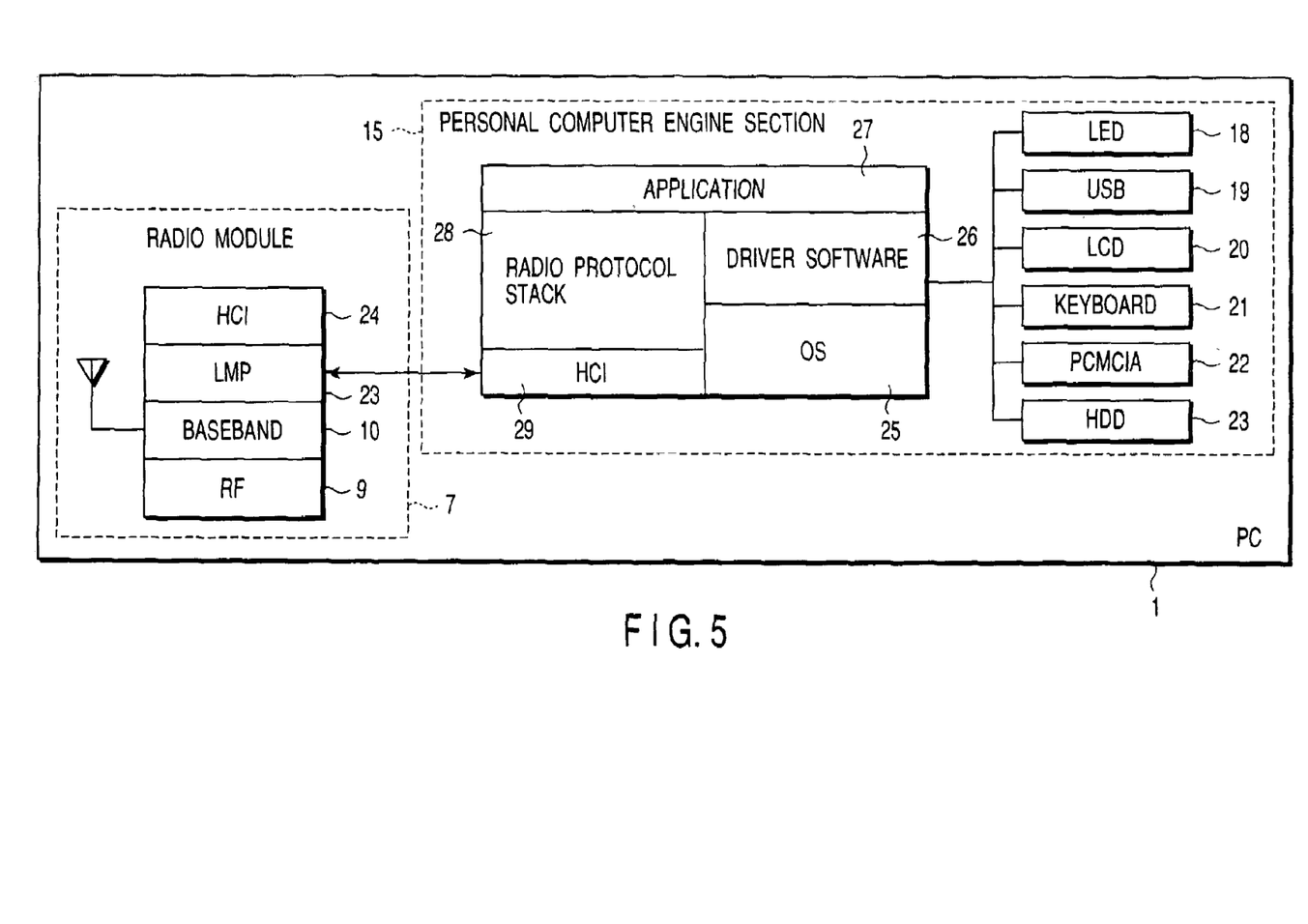
FIG. 5 is a block diagram showing a software configuration of the information providing server shown in FIG. 2.

FIG. 5 is a block diagram showing the software configuration of the personal computer 1. In a structure shown in FIG. 5, a radio protocol stack 28 for the radio communication of the 2.45 GHz band is mounted on a personal computer engine section 15 side.

On the radio module 7 side of the personal computer 1, as shown in FIG. 5, the RF section 9 and radio baseband section 10 are disposed as hardware. A link management protocol (LMP) 23 for controlling the radio link with the radio communication apparatus on a cellular phone 2 side via radio waves, and a host control interface (HCI) 24 for performing a serial interface processing with the personal computer engine section 15 are mounted on the radio baseband section 10.

Mounted in the personal computer engine section 15 are an operating system (OS) 25 positively mounted as the personal computer, driver software 26 for controlling various peripheral devices, and various applications 27 such as word processor software, table calculation software, electronic mail software, and system software for realizing a remote control function. Additionally, a radio protocol stack 28 for the radio communication of the 2.45 GHz band, an HCI 29 for performing a serial interface processing with the radio module 7 side, and the like are mounted.

Figure 6:
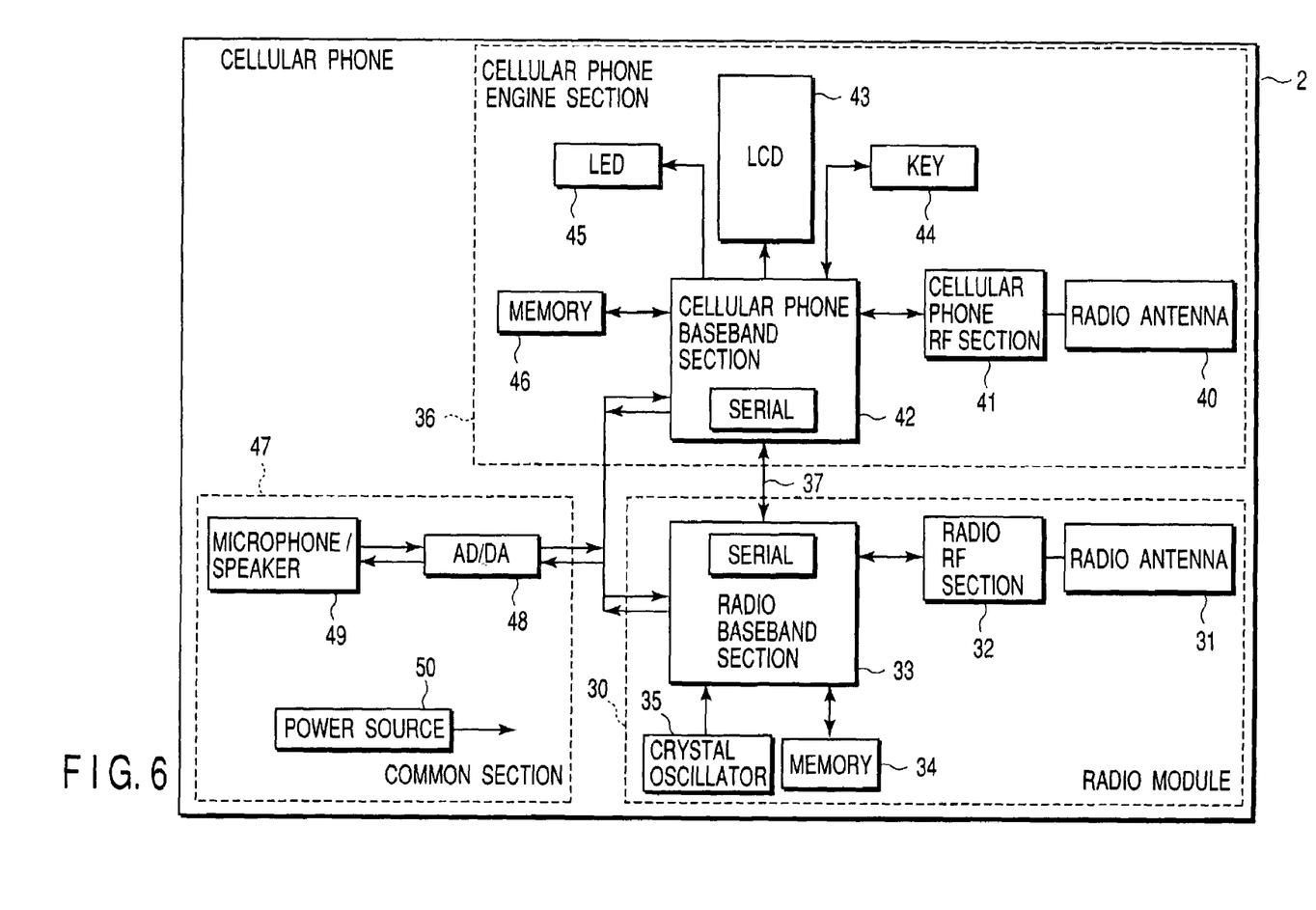
FIG. 6 is a block diagram showing a hardware configuration of a potable terminal shown in FIG. 2.

Constitution of Cellular Phone 2:

FIG. 6 is a block diagram showing the hardware configuration of the cellular phone 2. A hardware section necessary for realizing the present system will mainly be described.

In the cellular phone 2, as a radio module 30 for using radio waves of the 2.45 GHz band to communicate with the personal computer 1, a radio antenna 31, radio RF section 32, radio baseband section 33, memory 34, and crystal oscillator 35 are mounted. The radio module 30 is connected to a cellular phone engine 36 via a serial interface 37.

The radio antenna 31 is a section for transmitting/receiving 2.45 GHz band radio waves to realize radio communication with the personal computer 1. During reception the radio RF section 32 performs a processing of mixing radio waves received via the radio antenna 31 with the local frequency signal oscillated from the crystal oscillator 35, converting the RF signal to an intermediate frequency signal, and subsequently demodulating the IF signal to a digital signal to be handled by the radio baseband section 33. The radio baseband section 33 performs protocol processing. The radio baseband section 33 converts the signal inputted via the antenna 31 and RF section 32 to a data string which can be processed by the CPU.

During transmission, the reception flow is reversed. That is, the radio baseband section 33 converts the transmission data to the signal to be handled by the radio RF section 32 according to the predetermined protocol, and the radio RF section 32 modulates the signal to 2.45 GHz band radio waves and transmits radio waves via the radio antenna 31.

As a common section 47, an AD/DA converter 48, microphone/speaker 49, and power source 50 are disposed.

Figure 7:
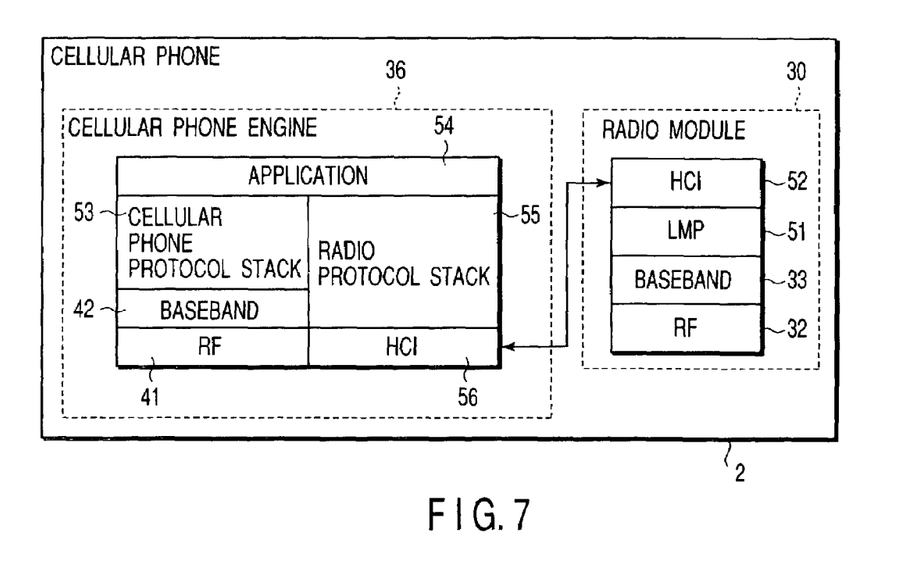
FIG. 7 is a block diagram showing a software configuration of the potable terminal shown in FIG. 2.

FIG. 7 is a block diagram showing the software configuration of the cellular phone 2. In the structure in FIG. 7, the radio protocol stack 53 of the 2.45 GHz band radio communication is mounted on a personal computer engine 36 side.

On the radio module 30 side of the cellular phone 2, as shown in FIG. 7, the RF section 32 and baseband section 33 are disposed as hardware. Moreover, a link management protocol 51 (LMP) for controlling the radio link with the radio communication apparatus on the personal computer 1 side via radio waves, and a host control interface (HCI) 52 for performing a serial interface processing with the cellular phone engine 36 are mounted on the baseband section 33.

In the cellular phone engine 36, an RF section 41, baseband section 42, and cellular phone protocol stack 53 are mounted as the cellular phone in a standard manner. Additionally, an application 54 including a system software for realizing the remote control function, radio protocol stack 55 for the 2.45 GHz band radio communication, and HCI 56 for performing the serial interface processing with the radio module 30 side are mounted.

Figure 8:
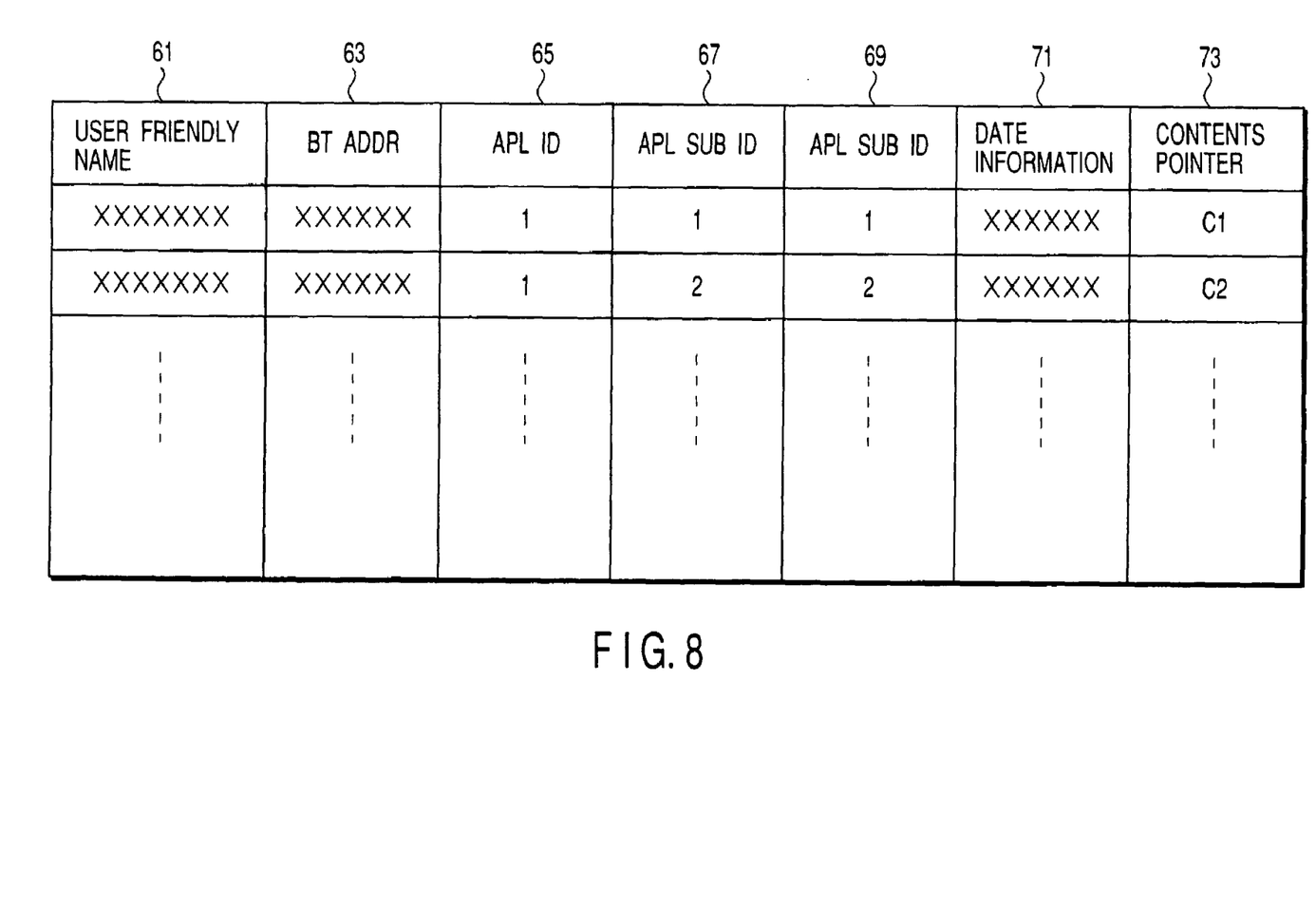
FIG. 8 is a diagram showing one example of a history management table of the information providing server and mobile terminal.

FIG. 8 shows one example of a transmission history management table stored in the HDD 23 of the personal computer 1 or a reception history management table stored in the memory 46 of the cellular phone 2. As shown in FIG. 8, the history management table comprises a user friendly name 61, Bluetooth address 63, application ID 65, application sub IDs 67 and 69, date information 71, and contents pointer 73. In each row of the table, data for each transmitted information (application) is registered in the table of the personal computer 1, and each received information is registered in the table of the cellular phone 2.

Figure 9:
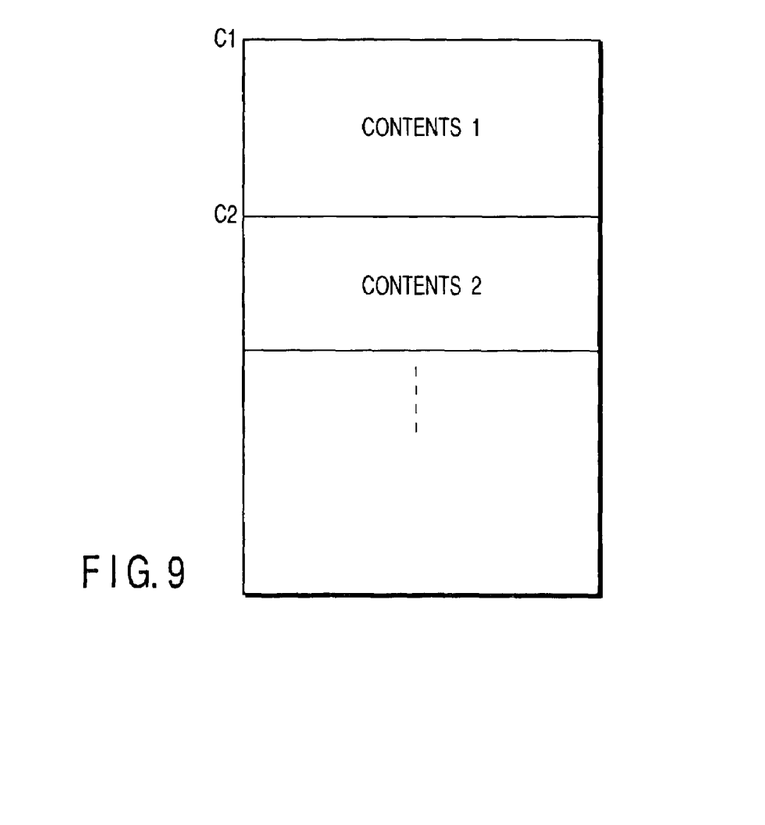
FIG. 9 is a diagram showing a location at which actual contents are stored and which is indicated by a contents pointer of the history management table shown in FIG. 8.

The Bluetooth address 63 is a unique inherent address of the radio module 30 of the cellular phone 2 as a transmission destination in the transmission history management table of the personal computer 1. The address is a unique inherent address of the radio module 7 of the personal computer 1 as a transmitter in the reception history management table of the cellular phone 2. The Bluetooth address 63 is constituted, for example, of a six byte numerals. The user friendly name 61 is information corresponding to Bluetooth address information attached in such a manner that the user can easily recognize the information. The application ID 65 is information indicating a distribution information category. For example, ID 65="1" denotes music, and ID 65="2" denotes movies. The application sub IDs 67 and 69 are information indicating a sub category. For example, the application sub ID 67="1" indicates a sub category "pop music", application sub ID 67="2" indicates a sub category "jazz", application sub ID 69="1" indicates a sub category "male singer", and application sub ID 69="2" indicates a sub category "female singer". Additionally, ID may indicates contents instead of the category. In this case, one ID is sufficient, and sub ID is unnecessary. The date information 71 indicates a date at which the contents are transmitted or received. As shown in FIG. 9, the contents pointer 73 indicates a location entry address of the HDD 23 or the memory 46 in which the respective contents are stored.

Figure 10:
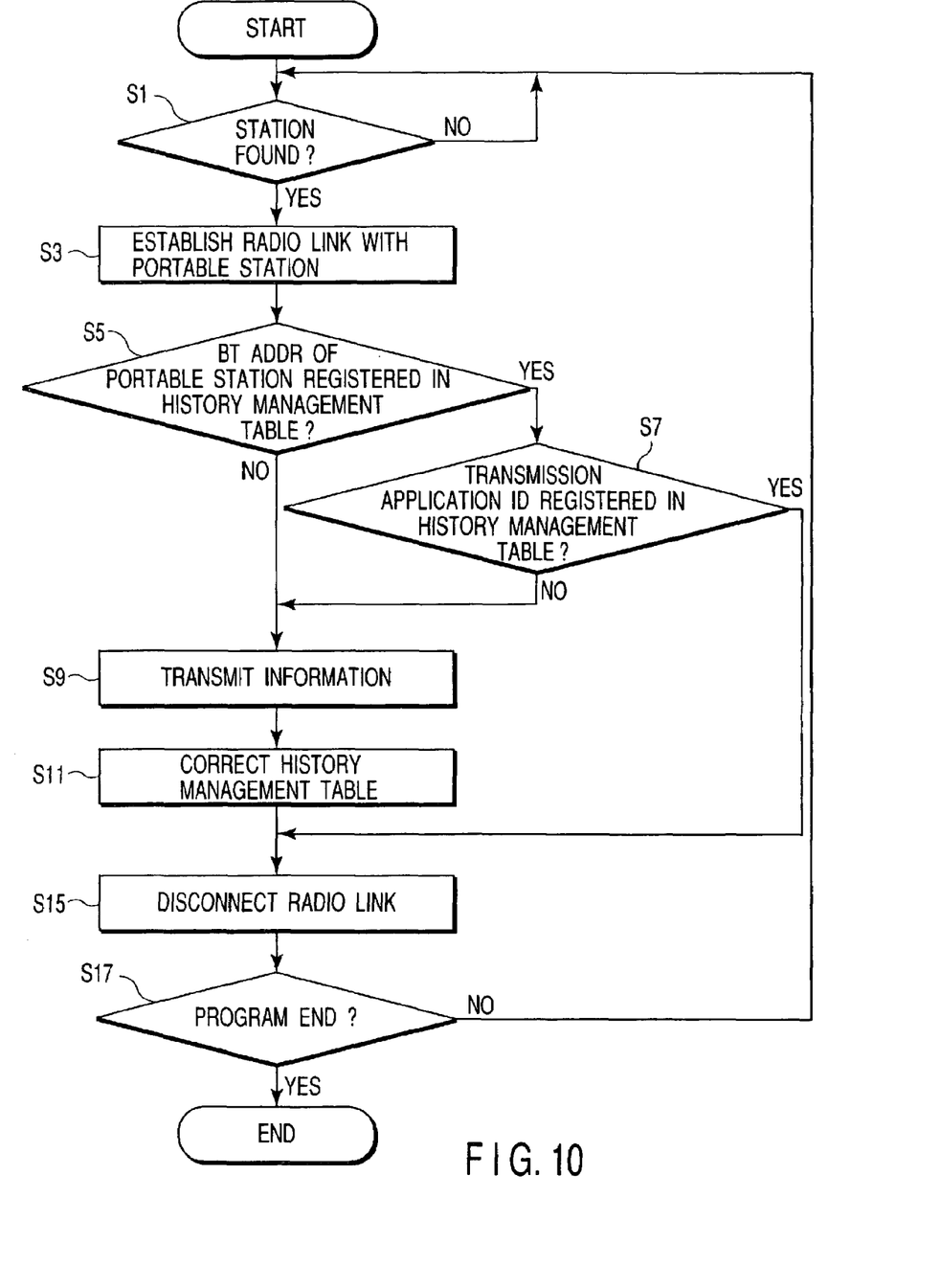
FIG. 10 is a flowchart showing a processing of using the 2.45 GHz band radio communication to connect the information providing server to the mobile terminal, and preventing the information providing server from repeatedly transmitting the same information to the mobile terminal.

FIG. 10 shows one example of a flowchart of a program for using the 2.45 GHz band radio communication to connect the information providing server (personal computer 1) to the mobile station (cellular phone 2), and preventing the personal computer 1 from repeatedly transmitting the same information to the cellular phone 2.

When the program is started by the personal computer 1, an inquiry about presence/absence of the radio-communicatable cellular phone 2 within reach of radio waves is transmitted via a broadcast request in order to find a cellular phone 2. The cellular phone 2 with which the radio communication is enabled can be found by a response to the inquiry transmission (step S1). With the absence of the radio-communicatable cellular phone 2, the processing of step S1 is repeated at periodic intervals until the radio-communicatable cellular phone 2 appears.

When the radio-communicatable cellular phone 2 exists, the radio baseband section 10 is controlled in order to establish a radio link using radio communication of the 2.45 GHz band, and the link to the 2.45 GHz band radio communication module on the side of the found cellular phone 2 is established (step S3). When there are plural of radio-communicatable cellular phones 2, plural links are established to the plural cellular phones 2. The Bluetooth address of the cellular phone 2 can be known by establishing the link.

It is determined in step S5 whether the Bluetooth address of the cellular phone 2 in the radio communication area agrees with the Bluetooth address 63 in the transmission history management table of the personal computer 1 (i.e., whether or not the cellular phone's address is registered in the personal computer 1).

If it is determined that the Bluetooth address of the cellular phone 2 in the radio communication area is already registered in the transmission history management table of the personal computer 1, it is determined in step S7 whether or not the ID and sub IDs of the application to be transmitted next are already registered in the transmission history management table in the personal computer 1.

If yes in step S7, it can be seen that the information has been transmitted from the personal computer 1 to the cellular phone 2. Therefore, no transmission processing is performed. As described later, after the information is transmitted, BT address of the cellular phone 2 as the transmission destination, and the ID and sub IDs of the transmitted application are registered in the transmission history management table. Therefore, when the address of the cellular phone 2, and application ID and sub IDs are registered in the history management table, it can be seen that the information has already been transmitted to the cellular phone 2. In this case, after the radio link is disconnected (step S15), the control processing returns to the first step S1. This can prevent the same information from being repeatedly transmitted to the same mobile station.

On the other hand, when the BT address of the mobile station does not exist in the history management table (no in step S5) or even when the BT address of the mobile station exists in the history management table, the application ID as well as sub IDs to be transmitted next do not exist in the transmission history management table at the row corresponding to the registered BT address (no in step S7), it can be seen that the information to be transmitted next has not been transmitted. Therefore, the personal computer 1 transmits the information only to the cellular phone 2 to which the information has not been transmitted yet (step S9).

After the transmission, the history management table is corrected or updated in step S11 if necessary. More specifically, the row of data corresponding to the information transmitted in step S9 is added to the transmission history management table. However, the number of rows possibly stored in the history management table is limited. When the row cannot be added, the row corresponding to the data having the address other than the Bluetooth address of the mobile station in the radio communication area found in step S1 is deleted. Therefore, the ID of the cellular phone 2 in the radio communication area and ID of the information transmitted to the cellular phone 2 are known from the history management table.

The radio link with the cellular phone 2 is disconnected in step S15. It is determined in step S17 whether there is a request for ending the program (information providing program) from the user. When there is an ending request, the program is ended. Moreover, when there is no ending request, the processing of step S1 is executed.

Since the data transmitted to the once connected cellular phone 2 is managed in this manner in the personal computer 1 (information providing server), the same information is prevented from being repeatedly transmitted to the same cellular phone 2, and the burden of the information providing server is remarkably reduced. Moreover, since the same information is prevented from being repeatedly received even in the cellular phone 2, power necessary for a reception processing can be remarkably suppressed.

According to the present embodiment, there is provided a mobile station which can communicate with an information providing server by radio, the mobile station comprising a radio link establishing section which establishes a radio link with the information providing server; an information receiving section which receives information from the information providing server after establishing the radio link; a history management table in which at least identification information of the information providing server having already received the information is stored; means for referring to the identification information in the history management table, and determining whether the information providing server is to transmit the same information as the already received information; and means for preventing the information from being received from the information providing server when the information providing server transmits the same information as the already received information.

The transmitted information is stored in the mobile station, and the information transmitted from the same information providing server is prevented from being received. The contents of the stored information can be checked at a time convenient for the user.

Moreover, after a series of information is transmitted from the information providing server to the mobile station while the mobile station is connected to the information providing server, the mobile station is disconnected from the information providing server. Even in the area in which the mobile station can communicate with the information providing server, the information providing server does not transmit a request for connection to the mobile terminal, and the mobile terminal does not receive the connection request from the information providing server.

Figure 11:
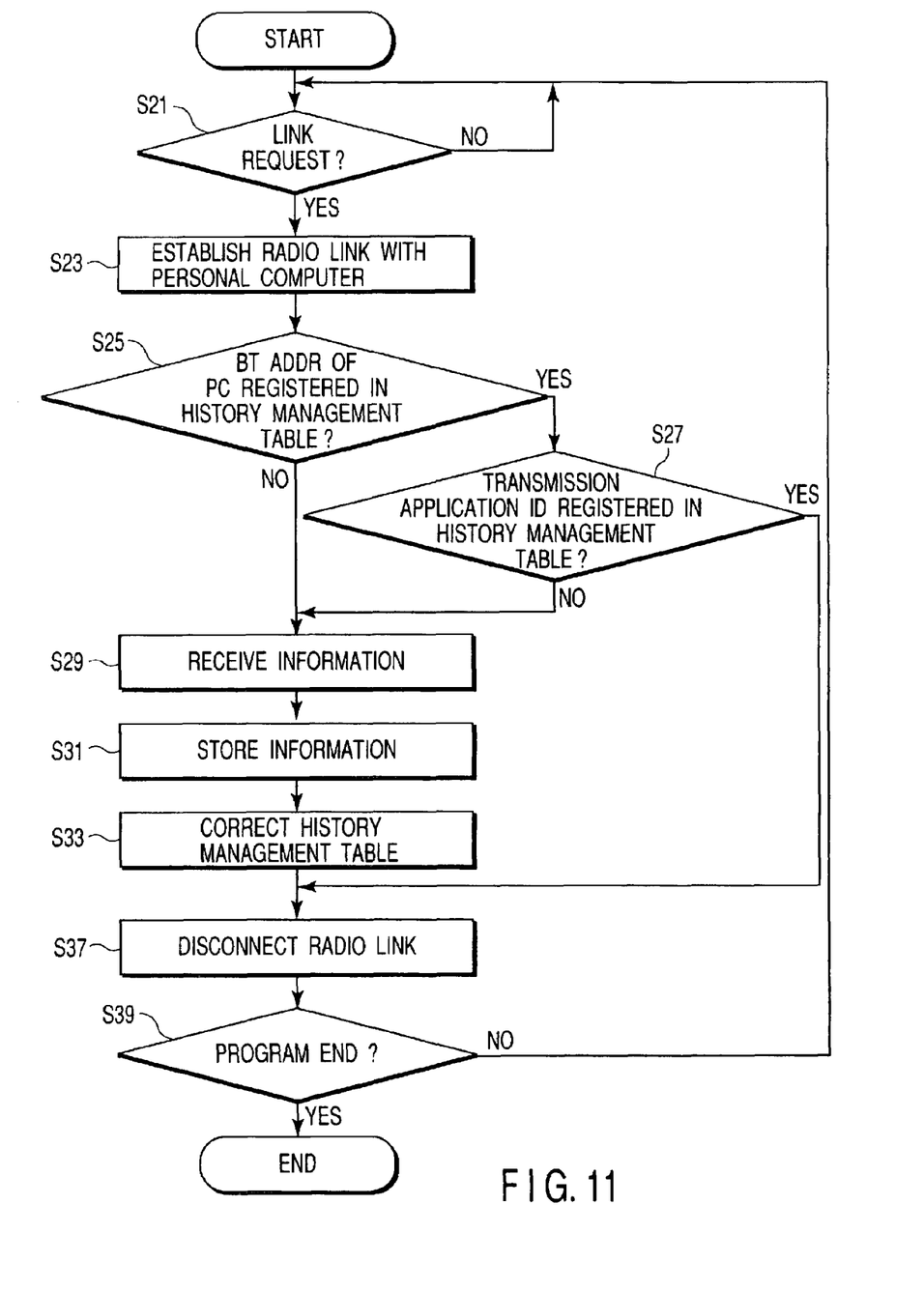
FIG. 11 is a flowchart showing a processing of using the 2.45 GHz band radio communication to connect the mobile terminal to the information providing server, and preventing the mobile terminal from repeatedly receiving the same information from the information providing server.

FIG. 11 shows one example of a flowchart of a program for using the 2.45 GHz band radio communication to connect the cellular phone 2 to the personal computer 1, and preventing the cellular phone 2 from repeatedly receiving the same information transmitted from the personal computer 1.

When the program is started by the cellular phone 2, it is determined whether there is a radio link request from another 2.45 GHz band radio communication apparatus (personal computer 1 in this example) (step S21). When there is no radio link request, the processing of step S21 is repeated at a periodic interval until the link request is received.

When there is a radio link request, the baseband section 33 is controlled in order to establish the radio link using the 2.45 GHz band radio communication, and the link to the 2.45 GHz band radio communication apparatus 1 is established (step S23).

It is determined in step S25 whether the Bluetooth address of the linked personal computer 1 agrees with the Bluetooth address 63 in the reception history management table of the cellular phone 2 (i.e., whether the address is already registered in the table).

If it is determined that the Bluetooth address of the personal computer 1 is already registered in the reception history management table, it is determined in step S27 whether or not the ID of the application to be transmitted by the personal computer 1 is already registered in the reception history management table in the cellular phone 2.

If yes in step S27, it can be seen that the information has already been received, and therefore no reception processing is performed. As described later, after the information is received, the BT address of the personal computer 1 as the transmitter of the information, and the ID and sub IDs of the received application are registered in the reception history management table. Therefore, when the BT address of the personal computer 1, and application ID and sub IDs are registered in the reception history management table, it can be seen that the information has already been transmitted from the personal computer 1. In this case, the radio link is disconnected (step S37), and the control processing returns to the first step S21. This can prevent the same information from being repeatedly received from the same personal computer 1.

On the other hand, when the BT address of the personal computer 1 does not exist in the reception history management table (no in step S25), or even when the BT address of the mobile station exists in the history management table, the application ID and sub IDs to be received next do not exist in the history management table at the row corresponding to the registered BT address (no in step S27), it can be seen that the information to be transmitted from the personal computer 1 has not been received yet. Therefore, the reception processing is carried out (step S29).

After the reception, the received information is stored in the memory 46 in step S31. However, when the capacity of the memory 46 is full, the oldest data is deleted. In step S31, the reception history management table is corrected or updated if necessary. If data is deleted from the memory 46 in step S31, the row of data corresponding to the deleted information is also deleted from the reception history management table. Then, a row of data corresponding to the stored information is added to the history management table. If the table capacity is full, the row of data corresponding to the oldest received data is deleted. Thereby, a history of received data in the past is left in the reception history management table.

The radio link with the personal computer 1 is disconnected in step S37. It is determined in step S39 whether there is a request for ending the program (information receiving program) from the user. When there is an ending request, the program is ended. Moreover, when there is no ending request, the processing of step S21 is executed.

Since the once received data is managed on the cellular phone side in this manner and the same information transmitted from the information providing server is prevented from being received, power consumption necessary for the reception of the cellular phone can be suppressed. Furthermore, since the received information is stored, the received contents can be checked at the user's desired timing.

The first embodiment can be modified as follows. The distribution information may be of one type. In this case, the application ID and sub IDs are unnecessary in the history management table, step S7 of monitoring the application ID and sub IDs is unnecessary in the transmission control flow (FIG. 10), and step S27 of monitoring the application ID and sub IDs is unnecessary in the reception control flow (FIG. 11). The transmission/reception may be controlled only by determining whether the BT address has been registered. Furthermore, even when the distribution information is of a plurality of types, the transmission/reception processing may be performed by monitoring only the application ID and sub IDs without considering the presence/absence of the registered BT address, and step S5 or S25 may be omitted.

As described above, according to the first embodiment, on the transmission side the transmission destination of the information to be distributed is managed and redundant transmission is prevented, and also on the reception side the received information is managed and redundant reception is prevented. Therefore, the same information is prevented from being redundantly received by the same mobile station, and the power consumption for reception in the mobile station can be suppressed. Moreover, when the received information is stored in the memory of the mobile station, the information can be browsed from the arbitrary position of the information.

In the first embodiment, the transmitted and received information are managed on both the transmission and reception sides. If it is unnecessary to transmit or receive, the radio link is disconnected from either apparatus, and no transmission/reception processing is performed, but such control function may be disposed only on the reception side.

In the first embodiment, since the individual information is transmitted to seven cellular phones at maximum, the transmission processing is controlled for each cellular phone. Transmission of the same information to the seven cellular phones at maximum will be described as a second embodiment. Transmission of the same information to a plurality of cellular phones is sometimes called broadcast. For example, repeated transmission of a train timetable and fare table to an unspecified number of cellular phones in a train station is considered. In this case, in view of the storage capacity or the like, it is difficult to store the connection history management table with respect to an unspecified number of cellular phones. Therefore, a personal computer as the information providing server repeatedly transmits the same information to seven cellular phones at maximum in the radio communication area of the personal computer without storing the connection history. However, when the same information is prevented from being repeatedly received on the cellular phone side, the effect similar to that of the first embodiment can be produced.

Figure 12:
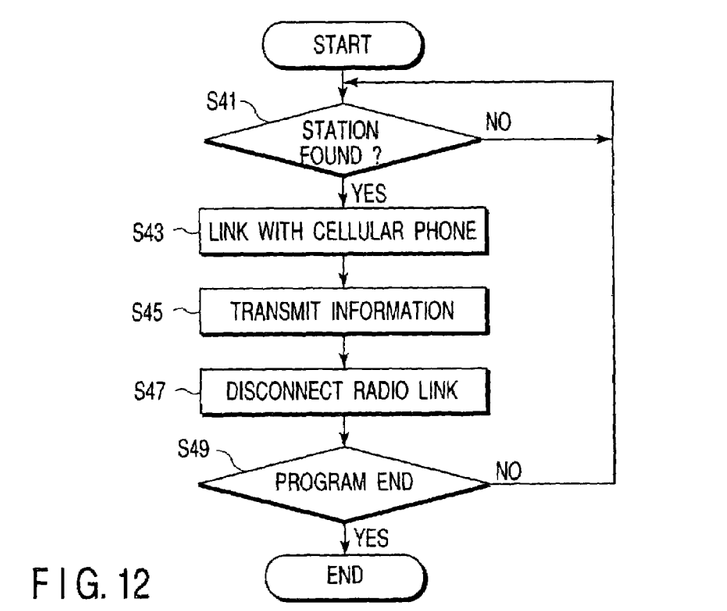
FIG. 12 is a flowchart showing a processing on an information providing server side, in which the information providing server broadcasts the information in a second embodiment.

FIG. 12 is a flowchart showing a processing on an information providing server side, in which the information providing server broadcasts/transmits contents.

In FIG. 12, when the program of the information providing server is started, an inquiry about the presence/absence of a radio-communicatable mobile station within reach of radio waves is transmitted via the broadcast request in order to find the radio-communicatable station. The station to be communicated can be found by the response (step S41) from the station. With the absence of the radio-communicatable station, the processing of step S41 is repeated at a periodic interval until the radio-communicatable cellular phone appears. When the radio-communicatable station exists, the radio baseband section 10 of the personal computer is controlled in order to establish a radio link using the 2.45 GHz band radio communication, and the radio link to the cellular phone is established (step S43). After the radio link is established, the information providing server transmits the information to the cellular phone (step S45). Subsequently, the radio link with the cellular phone is disconnected (step S47). It is finally determined whether there is a program ending request from the user (step S49). When there is the ending request, the program is ended. Moreover, when there is no ending request, the processing of step S41 is repeated.

According to the second embodiment, the processing on the cellular phone side is similar to the processing of the flowchart shown in FIG. 11.

In the above embodiments, there are a multiplicity of types of distribution information, and the information cannot be distinguished without using ID. However, contents to be transmitted are an application such that information can be distinguished only by date of the information, such as stock price information. In this case, the application ID and application sub IDs can be deleted from the history management table in FIG. 8. The data of the information indicates date of creating the information. If the date of the information to be transmitted/received is the same as that registered in the history management table, it is not necessary to transmit/receive the information.

Figure 13:
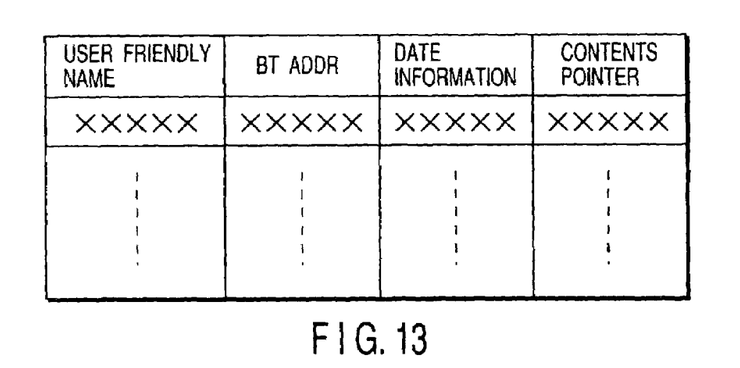
FIG. 13 is a diagram showing another example of the history management table in a third embodiment.

FIG. 13 is a diagram showing this history management table. As shown in FIG. 13, the history management table is constituted of the user friendly name, Bluetooth address, date information, and contents pointer.

Figure 14:
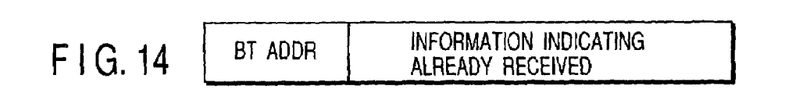
FIG. 14 is a diagram showing a processing for preventing the information providing server from repeatedly transmitting the same information to the mobile terminal in a fourth embodiment.

FIG. 14 showings another embodiment for preventing the information providing server from repeatedly transmitting the same information to the mobile station. In the embodiment, the radio link is established, the information including information indicating the contents of information already received by the mobile station (application ID and sub ID, and the like) is transmitted to the information providing server from the mobile station. Thereby, the information providing server can transmit contents other than the information indicated by the transmitted information to the mobile station. In this case, the information providing server does not need to have any history management table. Therefore, as in the first and second embodiments, the same information can be prevented from being repeatedly transmitted to the mobile station.

Figure 15:
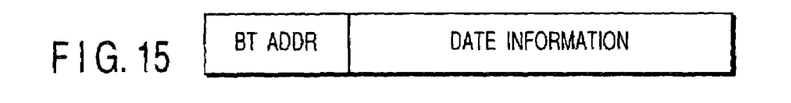
FIG. 15 is a diagram showing a modification example of the embodiment shown in FIG. 14.

FIG. 15 shows a modification example of the embodiment shown in FIG. 14. The information transmitted to the information providing server from the mobile station is constituted of the Bluetooth address and date information. The information providing server refers to the date information transmitted from the mobile station, and can transmit any information newer than the date information. In this case, the repeated transmission of the same information to the cellular phone can be prevented.

The present invention is not limited to the above embodiments. Devices other than the personal computer and the cellular phone can be used as the information providing server and mobile station. The information distributed to the mobile stations is not limited to the above example. The radio link is not limited to the 2.45 GHz band radio communication of Bluetooth.

INDUSTRIAL APPLICABILITY

According to the present invention, a radio communication apparatus comprises a reception history table configured to store information-identification identifying information which has been received; and a controller configured to prevent information from being received of which information-identification is stored in said reception history table.

According to the present invention, a radio communication apparatus comprises a transmission history table configured to store information-identification identifying information which has been transmitted; and a controller configured to prevent information from being transmitted of which information-identification is stored in said transmission history table.

The information repeatedly transmitted from the information providing server is prevented from being repeatedly received. Therefore, the power consumption necessary for reception can be reduced.

What is claimed is:

1. A radio communication apparatus comprising:
   means for connecting a radio link to a receiver;
   a transmission history table which stores information-identification of information which is transmitted;
   means for determining that new information-identification of information which is to be transmitted is stored in the transmission history table;
   information transmitting means for transmitting the information to the receiver and writing the new information-identification in the transmission history table when the new information-identification is not stored in the transmission history table; and
   means for disconnecting the radio link when the new information-identification is stored in the transmission history table.

2. The radio communication apparatus according to claim 1, wherein:
   said transmission history table further stores receiver-identification of a receiver to which the information was transmitted;
   said determining means determines that new information-identification of information which is to be transmitted and new receiver-identification of a receiver to which the information is to be transmitted are stored in the transmission history table;
   said information transmitting means transmits the information to the receiver and writes the new receiver-identification and the new information-identification in the transmission history table when the new receiver-identification and the new information-identification are not stored in the transmission history table; and
   said disconnecting means disconnects the radio link when the new receiver-identification and the new information-identification are stored in the transmission history table.

3. A radio communication apparatus comprising:
   means for connecting a radio link to a receiver;
   a transmission history table which stores receiver-identification of a receiver to which information was transmitted;
   means for determining that new receiver-identification to which information is to be transmitted is stored in the transmission history table;
   information transmitting means for transmitting the information to the receiver and writing the new receiver-identification in the transmission history table when the new receiver-identification is not stored in the transmission history table; and
   means for disconnecting the radio link when the new receiver-identification is stored in the transmission history table.

4. The radio communication apparatus according to claim 3, wherein:
   said transmission history table further stores information-identification of information which was transmitted;
   said determining means determines that new information-identification of information which is to be transmitted and new receiver-identification of a receiver to which the information is to be transmitted are stored in the transmission history table;

said information transmitting means transmits the information to the receiver and writes the new receiver-identification and the new information-identification in the transmission history table when the new receiver-identification and the new information-identification are not stored in the transmission history table; and said disconnecting means disconnects the radio link when the new receiver-identification and the new information-identification are stored in the transmission history table.

5. A method for radio communication comprising:

connecting a radio link to a receiver;

storing information-identification of information which is transmitted in a transmission history table;

determining that new information-identification of information which is to be transmitted is stored in the transmission history table;

transmitting the information to the receiver and writing the new information-identification in the transmission history table when the new information-identification is not stored in the transmission history table; and disconnecting the radio link when the new information-identification is stored in the transmission history table.

6. The method for radio communication according to claim 5, comprising:

determining that new information-identification of information which is to be transmitted and new receiver-identification of a receiver to which the information is to be transmitted are stored in the transmission history table;

transmitting the information to the receiver and writing the new receiver-identification and the new information-identification in the transmission history table when the new receiver-identification and the new information-identification are not stored in the transmission history table; and disconnecting the radio link when the new receiver-identification and the new information-identification are stored in the transmission history table; and wherein said transmission history table further stores receiver-identification of a receiver to which the information was transmitted.

7. A method for radio communication comprising:

connecting a radio link to a receiver;

storing receiver-identification of a receiver to which information was transmitted in a transmission history table;

determining that new receiver-identification to which information is to be transmitted is stored in the transmission history table;

transmitting the information to the receiver and writing the new receiver-identification in the transmission history table when the new receiver-identification is not stored in the transmission history table; and disconnecting the radio link when the new receiver-identification is stored in the transmission history table.

8. The method for radio communication according to claim 7, comprising:

determining that new information-identification of information which is to be transmitted and new receiver-identification of a receiver to which the information is to be transmitted are stored in the transmission history table;

transmitting the information to the receiver and writing the new receiver-identification and the new information-identification in the transmission history table when the new receiver-identification and the new information-identification are not stored in the transmission history table; and disconnecting the radio link when the new receiver-identification and the new information-identification are stored in the transmission history table; and wherein said transmission history table further stores information-identification of information which was transmitted.

* * * * *

UNITED STATES PATENT AND TRADEMARK OFFICE
CERTIFICATE OF CORRECTION

PATENT NO. : 6,980,083 B2
DATED : December 27, 2005
INVENTOR(S) : Sako et al.

It is certified that error appears in the above-identified patent and that said Letters Patent is hereby corrected as shown below:

<u>Title page,</u>
Insert -- Item [30], Foreign Application Priority Data
    Jul. 6, 2000    (JP) .....................2000-205085 --.

Signed and Sealed this

Thirteenth Day of June, 2006

JON W. DUDAS
*Director of the United States Patent and Trademark Office*